June 8, 1943.　　M. J. MARGULIS　　2,321,402
AUTOMATIC VENDING MACHINE
Filed Oct. 23, 1937　　6 Sheets-Sheet 1

Inventor
Morris J. Margulis
By Sheridan, Davis & Cargill
Attorneys June 8, 1943.  M. J. MARGULIS  2,321,402
AUTOMATIC VENDING MACHINE
Filed Oct. 23, 1937   6 Sheets-Sheet 2

Inventor
Morris J. Margulis
BY
Sheridan Davis & Cargill
Attorneys

June 8, 1943.  M. J. MARGULIS  2,321,402
AUTOMATIC VENDING MACHINE
Filed Oct. 23, 1937   6 Sheets-Sheet 4

Inventor
Morris J. Margulis
By Sheridan Davis & Cargill
Attorneys

June 8, 1943. M. J. MARGULIS 2,321,402
AUTOMATIC VENDING MACHINE
Filed Oct. 23, 1937 6 Sheets-Sheet 5

Inventor
Morris J. Margulis
By Sheridan Davis & Cargill
Attorneys

Patented June 8, 1943

2,321,402

UNITED STATES PATENT OFFICE 2,321,402

AUTOMATIC VENDING MACHINE

Morris J. Margulis, Philadelphia, Pa., assignor to Rock-Ola Manufacturing Corporation, Chicago, Ill., a corporation of Delaware Application October 23, 1937, Serial No. 170,521

2 Claims. (Cl. 274—15)

This invention relates to an automatic vending machine and has particular reference to an automatic machine for vending visible information in the form, for example, of written compositions or articles, and audible information relating to the visible information.

It is an object of the invention to provide a mechanism which will automatically vend any selected one of a plurality of articles and audible information relating to or characterizing the particular selected article.

It is another object of the invention to provide a mechanism which will vend related visible and audible information on, for example, horoscopy.

A further object of the invention is to provide apparatus which will vend visible and audible information relating to the horoscopal significance of any selected one of the signs of the zodiac.

Another object of the invention is the provision of apparatus which may be set to indicate any one of the zodiacal signs and which will thereafter select and reproduce a predetermined one of a plurality of phonographic recordings relating to that zodiacal sign and will select from a plurality of written compositions and will deliver to the operator the composition relating in subject matter to that zodiacal sign.

It is a further object of the invention to provide mechanism which will deliver any one of a plurality of articles and will play any one of a plurality of phonographic records, and which contains selective mechanism adapted so to control those operations that after any selected article a particular record associated therewith will be played.

Another object of the invention is to provide auxiliary phonograph means operative intermittently and only while the vending apparatus is not operating, the auxiliary phonograph means being adapted to play a record advertising the operation of the machine.

Other objects and advantages of the invention will be apparent as it is better understood from the following description, which, taken in connection with the accompanying drawings, discloses a preferred embodiment thereof.

The particular embodiment of the invention disclosed is a machine for the automatic and selective vending of booklets or pamphlets and phonographic reproductions, each describing the horoscopal significance as astrologically determined of one of the twelve signs of the zodiac. An operator sets the selective mechanism to indicate a sign of the zodiac, for example, the sign for the period during which the operator was born, and operates the coin controlled starting mechanism. One of a series of twelve phonographic records bearing a recorded speech or lecture related in subject matter to the selected zodiacal period with, if desired, appropriate musical interludes, is then reproduced or played and one of a plurality of booklets, pamphlets or other written compositions, relating in subject matter to the horoscopal significance of the selected zodiacal period is delivered to the operator. At intervals during any period at which the machine is not being operated as just described, auxiliary phonographic means reproduces or plays an advertising talk to induce patronage and, if desired, music to attract attention to the machine.

It will be understood that the mechanism for selecting and playing any one of a plurality of phonographic records is not per se my invention. Many such phonographic mechanisms are known in the art and may be employed in the present invention. The one shown is intended to be illustrative only and is more fully described in United States Letters Patent No. 2,002,236, of Russell I. Wilcox, dated May 21, 1935. For convenience, the parts and elements of the phonographic mechanism referred to in the following description and shown in the accompanying drawings have been given the reference characters corresponding to those employed in the mentioned Wilcox patent.

Referring to the drawings, the machine in accordance with the present invention comprises a frame 1, preferably of metal, which may be mounted in a suitable cabinet and which supports the rest of the structure. Mounted on the frame 1 is a motor 2, which rotates the motor shaft 3 having worm gears 4 and 5 thereon.

The worm gear 4, through a series of gears and means hereinafter described, rotates a turntable 8, while the worm gear 5 meshes with a pinion 9 loosely mounted on a cam shaft 10. Clutch mechanism 11 connects the pinion 9 with the cam shaft 10.

Fixedly mounted on the cam shaft 10 are cams 12, 13 and 14 to control the operation of the machine, as will be hereinafter described. When the machine has been started, the motor 2, the drive shaft 3 and pinion 9 rotate continuously while the cam shaft 10 makes one revolution to complete the cycle of playing one record and dispensing and delivering one article and returning the machine to initial position ready for the subsequent operation. During each revolution of the cam shaft 10, the various cams control the sequential operation of the mechanism as will now be described.

The cam 12 operates the selective mechanism to rotate a selector shaft 17 upon which is fixedly mounted a cam 18 which controls the selection of the records and to which is connected, by means of a chain drive 231, a rotary switch plate 235 which controls the position of the dispensing mechanism. The cam 12 likewise operates, through linkages which will hereinafter be described, an arm 263, which serves to discharge the article to be dispensed or delivered from the machine. The cam 13 causes the selected record to be swung to a position above the turntable 8. The cam 14 raises the turntable to pick up the record selected and to raise it upwardly into playing position. When the turntable has reached its maximum height, the clutch 11 is disengaged from the pinion 9, and the cam shaft 10 remains stationary until the record has been played. Thereafter, the clutch 11 is tripped to engage the pinion 9, and the cam shaft 10 is again rotated. The cam 14 then lowers the turntable and deposits the record in the record holder, and the cam 13 permits the record holder to be swung back into inoperative position and swings a tone arm 19 back into starting position. The mechanism is then ready to repeat the cycle.

*Selective mechanism*

A preferred form of selective mechanism is shown particularly in Figs. 5, 7, 10 and 13. The selector shaft 17 is rotatably mounted in the frame 1. A ratchet 20 is loosely mounted on the selector shaft 17 adjacent a wheel 21 which is fixed to the shaft. On the face of the wheel 21, adjacent the ratchet 20, is a pawl 22 held in engagement with the ratchet 20 by a spring which is not shown in the drawings. Thus, when the ratchet 20 is rotated in the direction of the arrow in Fig. 7, the wheel 21 and the connected selector shaft 17 will be rotated, while when the ratchet 20 is rotated in the opposite direction, the pawl slides on the teeth thereof, and the selector shaft does not move.

Figures 5, 6, 7:
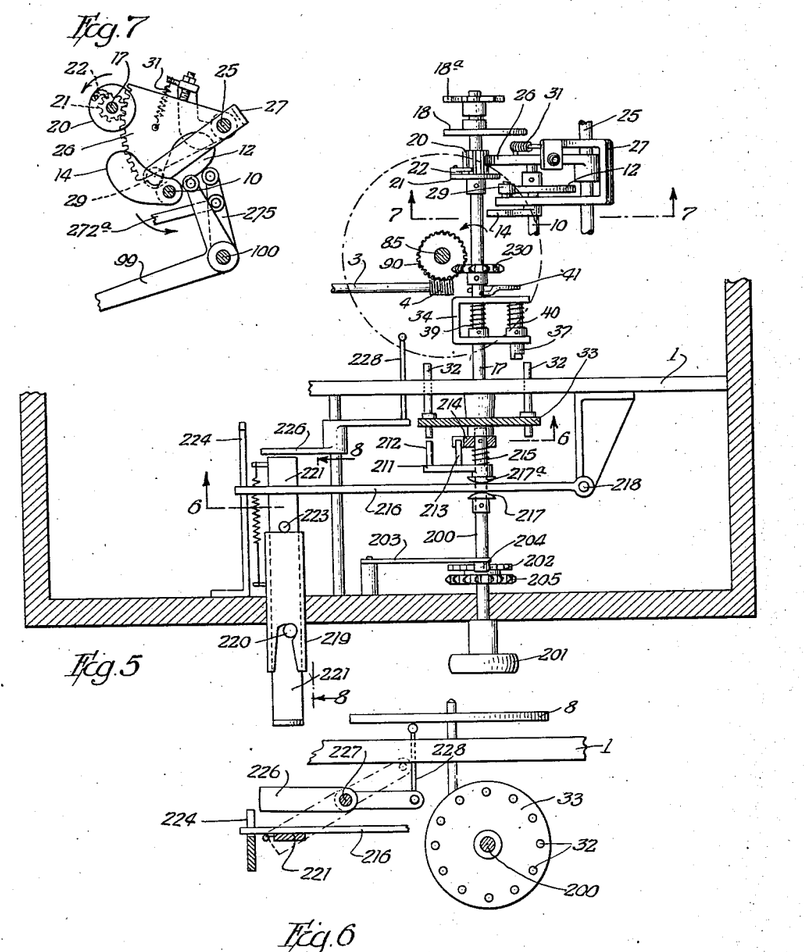
Fig. 5 is a horizontal sectional view taken on the line 5—5 of Fig. 2.
Fig. 6 is a fragmentary sectional view taken on the line 6—6 of Fig. 5.
Fig. 7 is a detail view of cams for operating the selective mechanism and part of the vending mechanism.
Figure 8:
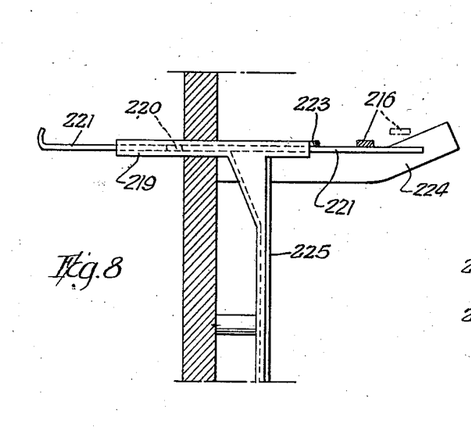
Fig. 8 is a fragmentary sectional view on the line 8—8 of Fig. 5, showing the coin slide and associated elements.

In order to rotate the ratchet 20, and thereby the selector shaft 17, a stud shaft 25 is mounted in the frame 1. Loosely mounted on the stud shaft 25 is a gear segment 26 meshing with the teeth of the ratchet 20, so that when the gear segment 26 is pivoted on the stud shaft 25, the ratchet 20 and the selector shaft 17 may be rotated. Also loosely mounted on the stud shaft 25, on each side of the segment 26, is a hook-shaped frame 27 having the long side thereof provided with a roller 29 adjacent its outer end, which roller runs on cam 12. Resilient members, such as springs 31, are connected at one end to an extension of the hook-shaped frame 27 and at the other end to the segment 26 adjacent the outer end thereof.

The rotation of cam 12 causes the frame member 27 to be pivoted about the shaft 25 and, due to the action of the springs 31, the segment 26 is pivoted upwardly therewith. The selector shaft 17 is thus rotated and the extent of its rotation determines the particular record to be played and the particular article to be dispensed. The cam 18 fixed on the outer end of the selector shaft 17, rotates with the selector shaft, and the position of the cam determines the particular record to be played as will hereinafter be explained. A sprocket 230, fixed on the selector shaft 17, operates the chain 231 to operate the rotary switch plate 235, the position of which determines, in a manner that will hereinafter be described, the particular article that will be dispensed from the machine.

The ratchet 20 and the gear segment 26 are so arranged that when the segment 26 is pivoted its full distance, it will cause the ratchet 20 to make a complete revolution. In other words, every time that segment 26 is raised upwardly its full distance, the cam 18 and the rotary plate switch 235 will each make a complete revolution.

In order to control the amount of rotation of the selector shaft 17 so that particular records may be played and particular articles dispensed, means are provided for stopping the rotation of the shaft at the proper point. A plurality of rods 32, corresponding in number to the number of records and to the number of kinds of articles held in the machine, are provided in the front of the machine and extend through the front of the frame 1, as shown in Fig. 5. These rods are longitudinally reciprocable so that they may be moved inwardly and outwardly of the frame 1. Mounted on the selector shaft 17, adjacent the inner ends of the rods 32, is a U-shaped member 34. That member 34 may be moved longitudinally along the shaft 17 against the action of a spring 39 acting between the member 34 and a collar fixed on the shaft 17 to rotate therewith. A stop 37 extends through the outer ends of the U-shaped member 34. A spring 40 is positioned between the inner side of the member 34 and a collar on the stop 37. The stop member is so positioned that the outer end thereof is slightly inwardly of the inner ends of the rods 32 when they are in normal position, as shown in Fig. 5. When, however, one of the rods 32 is pushed inwardly by means that will hereinafter be described, the outer end of the stop 37 engages the inner end of this rod 32, and prevents further rotation of the selector shaft 17.

As the rotation of the shaft 17 serves in the manner heretofore described to select the record to be played and the article to be dispensed, a selection is predetermined by pushing in one of the rods 32. This is accomplished, as is best shown in Fig. 5, through rotation of a shaft 200 and the action of a coin slide 221. The operator in making a selection turns the shaft 200 by means of a knob 201 positioned on the front of the cabinet, until an indicator 209 fixed on a stud shaft 208 indicates the desired article, in this particular case, the appropriate sign of the zodiac. The indicator 209 rotates with the shaft 200 through the action of a sprocket 205 mounted on the shaft 200, a chain 206, and a sprocket 207 mounted on the stud shaft 208. A yielding detent 204 at the end of an arm 203 is held against a ratchet wheel 202 on the shaft 200 by the action of a spring 203a, and serves to provide that shaft 200 with a plurality of fixed positions. As the shaft 200 is rotated, a slotted wheel 214 fixedly mounted thereon is likewise rotated, and this by means of a pin 213 effects the simultaneous rotation of an arm 211, which is loosely mounted on the shaft 200. A second pin 212 extends from the outermost end of the arm 211 and is positioned in proximity to the outer ends of the pins 32. Upon rotation of the shaft 200, the pin 212 will be positioned adjacent and in line with the outer end of one of the pins 32.

The coin slide 221 slidable in a guide plate 219 extends through the front wall of the cabinet. When a coin 220 is placed in a recess in the slide 221 and the slide is pushed inwardly, a pin 223 engages an arm 216, which is pivotally attached to a frame member as at 218 for movement on a vertical axis and is also pivotally movable on a horizontal axis, and the free end of which rests upon the coin slide 221. The forward position of the arm 216 is limited by a collar 217 fixedly mounted on the shaft 200. As the coin slide 221 is pushed inwardly, the arm 216 will be forced rearwardly. During its rearward movement the arm 216, engaging a collar 217a mounted on arm 211, will force this arm and the pin 212, carried thereby, rewardly against the action of a spring 215 on shaft 200. and in so doing will push in the particular pin member 32 in line with the pin 212. Upon further inward movement of the coin slide 221, the arm 216 will be cammed upwardly by a member 224 and will thus be released from engagement with the pin 223.

Figure 13:
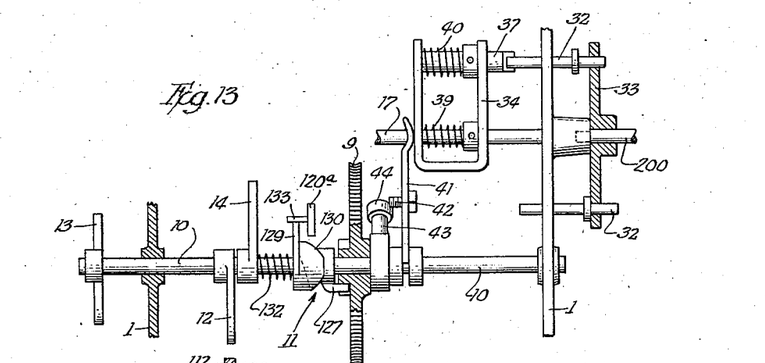
Fig. 13 is a cross sectional view showing the cam shaft and associated cams and selector mechanism.

As the selector shaft 17 is rotated, as hereinbefore described, rotation will continue until the stop member 37 engages the pushed-in rod 32 as shown in Fig. 13. Further movement of the selector shaft is thereupon prevented, and the record corresponding to the rod 32, which is engaged by the stop 37, thereafter is played, and the article corresponding therewith is delivered.

In order to return the pushed-in rod engaged by the stop 37 to normal position, a resilient arm 41 is loosely mounted on the cam shaft 10 and is provided with a forked outer end which fits about the selector shaft 17 and guidably holds the arm 41 for sliding along the shaft 17. The outer surface of the arm 41 engages the U-shaped member 34. An adjustable projecting member 42 extends inwardly from the arm 41.

Fixedly mounted on the cam shaft 10 is a collar 43 having a rod extending outwardly therefrom with a roll or annular member 44 positioned adjacent the outer end thereof and spaced from the cam shaft a distance equal to that of the projecting member 42, so that when the cam shaft 10 rotates the roller 44 engages the projecting member 42 to move it outwardly, which in turn slides the U-shaped member 34 along the shaft 17 and pushes the rod engaged by the stop 37 outwardly to normal position.

Referring now more particularly to Fig. 7, it will be seen that the frame 27 will always be pivoted about the shaft 25 to the same extent under the action of the cam 12, regardless of the position of any pin 32. On the other hand, the segment 26 will be stopped, after moving only part way up, against the action of the springs 31 whenever the stop 37 engages one of the pins 32 so that the selector shaft 17 can rotate no further.

*Record holder*

The phonographic records to be used in the device are placed in a plurality of record carriers 47. Each carrier 47 comprises an annular ring having a flange extending inwardly therefrom to form a shelf. Extending from one side of each of the record carriers 47 is an arm 50 (see Fig. 12) having an opening therein and which extends through horizontal slots arranged in a cylindrical casing 52. These slots are arranged in pairs on opposite sides of the casing 52, one pair of slots being provided for each of the record carriers 47 as shown more particularly in the Wilcox patent above mentioned. The casing 52 is fixedly mounted on the frame 1. A shaft 54 extends down through the center of the cylindrical casing 52 and through the openings in the arms 50 and is rotatably mounted in the frame 1.

Figure 3:
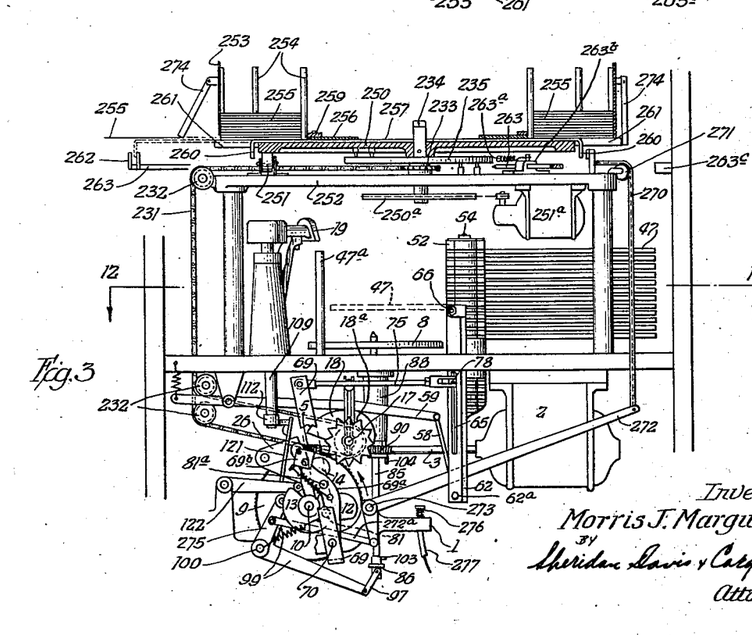
Fig. 3 is a rear elevational view showing the operating mechanism of the device.

A bar 62 is slidably mounted on the shaft 54 by means of parts not herein illustrated but which are shown in said Wilcox patent and is pivotally connected at 62a to a link member 58 and by the latter to the outer end of a lever 59 which is pivotally mounted on the frame 1 (see Fig. 3). A longitudinal slot 65 is provided in the center portion of the bar 62 and a projecting member such as a screw 66 is threaded into the bar adjacent its uppper end, as shown particularly in Figs. 3 and 12. The inner end of this screw 66 is adapted to engage the outer end of any of the arms 50, which extend beyond the cylindrical casing 52 and are provided with cutout portions each for engagement with the inner end of the screw 66. This is shown particularly in Fig. 12.

The bar 62 is reciprocable along the shaft 54 to bring the screw 66 adjacent the outer end of the record carrier 47 holding the selected record. The vertical movement of the bar 62 is controlled by the rotation of the cam 18 on the selector shaft 17, which at all times abuts a roller on the lever 59. Cam 18 has a plurality of positions respectively corresponding to fractional revolutions and is so formed that for each such fractional revolution thereof, the lever 59 will be raised a definite distance to thereby bring the screw 66 on the bar 62 directly opposite the outer end of any one of the selected arms 50 of the record carriers 47.

In the particular embodiment of the invention shown, the cam 18 has twelve such positions, respectively corresponding to the twelve records that may be selected. There are likewise twelve of the rods 32 which control the amount of rotation of the selector shaft 17, as has been hereinbefore described. Thus, operation of any one of the twelve rods 32 will cause the selector shaft to rotate a certain fraction of a revolution corresponding to the rod 32 pushed in, and the cam 18 will thus assume one of its twelve positions, bringing the screw 66 opposite the selected one of the twelve records.

In order to insure that the screw 66 carried on the bar 62 will at all times be positioned directly opposite one of the arms 50 on the record carriers 47, and not in between these arms, a star wheel 18a is fixedly mounted on the outer end of the selector shaft 17. This star wheel has twelve points and is adapted, during operation of the mechanism, to be fixedly locked in one of the twelve positions. This is accomplished by a locking dog 69b mounted adjacent the outer end of a lever 69a, pivotally mounted on a stud shaft 70. The locking dog 69b is normally held out of engagement with the star wheel 18a by means of a spring. A roller 81a is mounted on the lever 69a and is adapted to be actuated by the cam 13 in its rotation. Under the action of the cam 13, the locking dog 69b will be forced into engagement with the star wheel 18a, locking it fixedly in position and insuring that the screw 66 will be brought directly opposite the outer end of the arm 50 on the record carrier 47 holding the selected record.

*Means for operating the record carriers*

After the screw 66 has been properly positioned to select the desired or predetermined record, the next step is to swing the record carrier with the record thereon out over the turntable so that it may be picked up and deposited thereon. To accomplish this, a J-shaped lever 69, shown particularly in Fig. 3, is pivotally mounted adjacent its lower end on the stud shaft 70. Attached to the upper end of the lever 69, by means of a universal connection, is a link 75. The link 75 is made adjustable as to length by a turnbuckle or other means, and is pivotally connected at its other end to an arm 78 which is suitably fixed to the shaft 54 and which extends through the slot 65. Thus, when the upper end of the lever 60 is pivoted back and forth, the arm 62 is pivoted about the shaft 54 and the screw 66, being in engagement with the outer end of the arm 50 of the record carrier 47, causes the record carrier to be pivoted about the shaft 54 to swing the record out into position directly above the turntable 8. The extent of the outward movement of the record carrier 47 is controlled by the length of the link 75 and may likewise be controlled by the provision of a stop post 47a mounted in the frame 1.

The short side of the J-shaped lever 69 is provided with a roller 81 adjacent its outer end. This roller rides the semicircular cam 13 on the outer end of the cam shaft 10, being held against the cam by means of a spring. As the cam shaft rotates, the cam 13 pivots the lever 69 to swing the record carrier out and holds the record carrier in this position until the record has been played. After the turntable has been lowered to deposit the played record in the record carrier, the cam 13 is rotated to release the record carrier 47 to permit it to be brought back to inoperative position by means of the springs 82.

*Means for operating the turntable*

Referring more particularly to Fig. 3, the turntable 8 is mounted on the upper end of a reciprocable shaft 85, which extends down through the frame 1, being slidable therein. It is supported by a bearing member 86 so that the shaft may be freely rotated in the bearing. Extending downwardly from the frame 1 is a supporting member 88, and loosely mounted on the shaft 85 is a pinion 90, which is held adjacent the lower surface of the supporting member 88. The pinion 90 is driven from the motor shaft 3 through the worm gear 4.

Pivotally attached to the bearing member 86 is a yoke 97, which is pivotally connected to the outer end of a bell crank lever 99 mounted on a stud shaft 100. The other end of the lever 99 is provided with a roller for engagement with the cam 14. As the cam 14 rotates with the cam shaft 10, the bell crank lever 99 is pivoted to raise the shaft 85 up through the frame 1. Fixed on the shaft 85 is a wheel having a pin 103 extending outwardly therefrom for engagement with a pin 104 on the lower side of the pinion 90. As the shaft 85 is raised to its uppermost position, these two pins engage, and the rotation of the pinion 90 is thus transmitted to the shaft 85 and the turntable 8.

As the turntable is raised, it passes up through the record carrier 47, which has been swung out into proper position and picks up the record thereon, raising it to a position to engage the needle in the sound pick-up 19 which cooperates with the rotating turntable and a suitable amplifier 19a and a loud speaker 19b to play the record.

*Dispensing mechanism*

Figures 1, 2, 15:
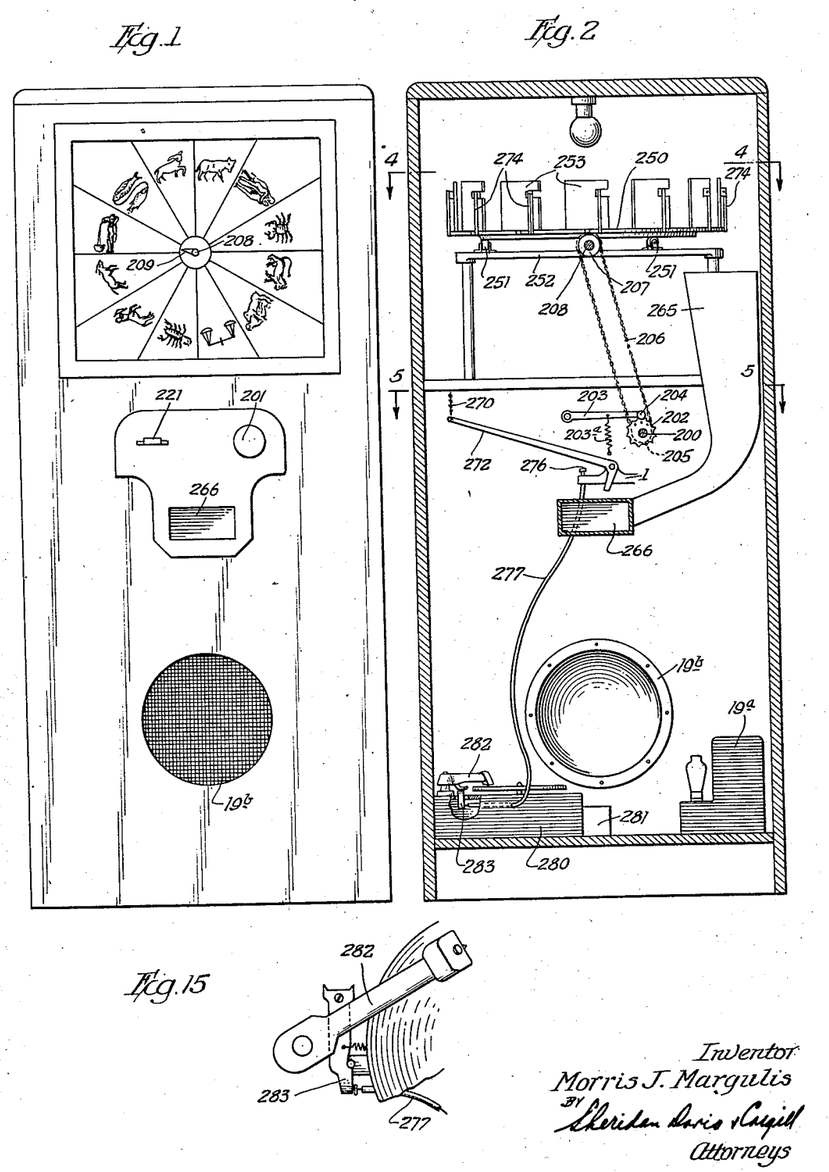
Fig. 1 is a front elevational view of a vending machine embodying the features of the invention.
Fig. 2 is a vertical sectional view taken behind the front panel showing the arrangement of various elements of the vending machine with most of the operating mechanism omitted.
Fig. 15 is a fragmentary plan view, partly broken away, of the auxiliary phonographic means.
Figure 4:
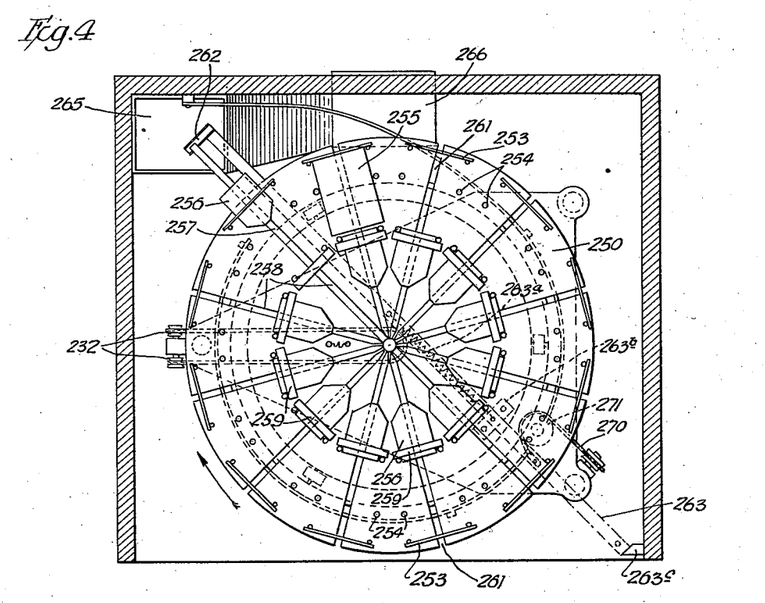
Fig. 4 is a horizontal sectional view taken on the line 4—4 of Fig. 2.

Referring to Figs. 2, 3 and 4, a rotatable circular magazine or table 250 provided with a plurality of compartments for holding the different types of pamphlets to be dispensed is supported on rollers 251 carried on a platform 252 mounted above and supported by the frame 1. A plurality of upright plates 253 arranged around the periphery of the table 250, together with a plurality of upright pins 254 define twelve compartments, each holding a plurality of pamphlets 255. A plurality of flat slides 257 adapted to slide in radial grooves 258 in the top of the table 250 carry on their upper surfaces plates 256. The outer ends of the slides 257 are provided with downturned flanges 260 which extend through radial slots 261 formed in the table 250. The plates 256 are approximately of the same thickness as the pamphlets 255 and are adapted, when the slides 257 are moved outwardly, to engage a pamphlet and push it out of the compartment through the opening beneath the plates 253.

The arm 263 extends beneath the rotatable table 250 and is slidably mounted in fixed guides 263b (one only being shown in Fig. 4) positioned on the upper surface of the platform 252. A spring 263a connected between the arm 263 and one of the fixed guides 263b normally holds the arm 263 retracted against the stop 263c fixed to the cabinet wall. A channel member 262 is fixed to the arm 263 adjacent its outer end and is adapted to engage any one of the downturned flanges 260 on the slides 257 as the table 250 rotates. Attached to the opposite end of the arm 263 is a cable or chain 270, which passes over sheaves 271 and is attached to the outer end of a bell crank lever 272.

The bell crank lever 272 is pivoted on a stud shaft 273 and its shorter arm is pivotally connected to one end of a link 272a. The other end of the link 272a is pivotally connected to a lever 275 adjacent the outer end thereof. The lever 275 is pivotally mounted on the stud shaft 100 and carries at its outer end a roller for engagement with the cam 12 on the cam shaft 10. As the cam shaft rotates, the cam 12 pivots the lever 275 about the shaft 100 and, through the link 272a, pivots the bell crank lever 272 downwardly. This causes the arm 263 to be moved outwardly, together with whatever slide 257 is engaged by the channel member 262, to the position shown in Fig. 3. By this action, one of the pamphlets 255 is forced out of one of the compartments on the table 250. As this pamphlet is pushed under the plate 253, a pendant arm 274, one of which is pivotally mounted at its upper end on the outer face of each of the plates 253 adjacent an edge thereof, tips or tilts the pamphlet off the slide 257 into a chute 265. That chute 265 extends downwardly and laterally from adjacent the edge of the table 250 and ends in an opening 266 in the front of the cabinet.

The magazine or table 250 is rotated to position the compartment containing the selected pamphlets 255 adjacent the chute 265 and to engage the slide 257 associated with that compartment with the arm 263 by means of a suitable electric motor 251a. To accomplish that result, the table 250 is fixed to a shaft 234 which extends through the platform 252 and carries adjacent its lower end a sprocket 250a. The motor 251a is connected by a reduction chain drive with the sprocket 250a and as soon as the motor is energized, which occurs when the main switch is closed on operation of the device, the table 250 will be slowly rotated.

Figure 10:
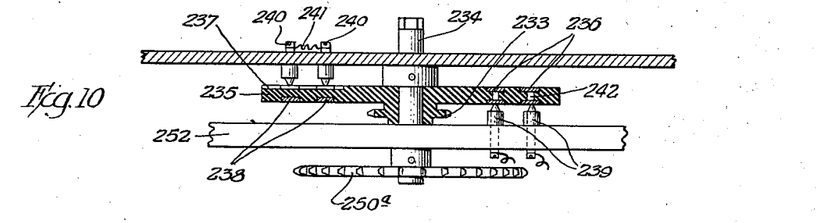
Fig. 10 is a detail cross sectional view showing the rotary switch plate controlling the position of the vending table.
Figure 11:
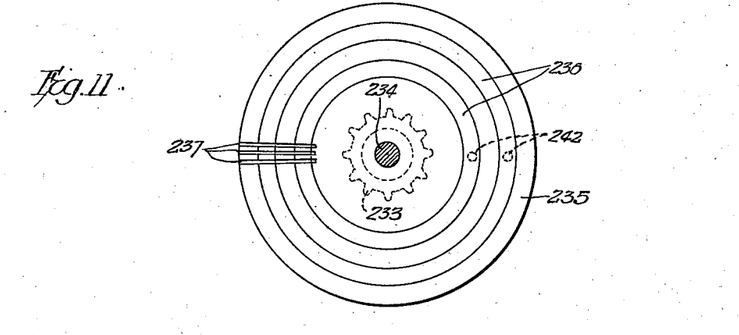
Fig. 11 is a plan view of said rotary switch plate.
Figure 16:
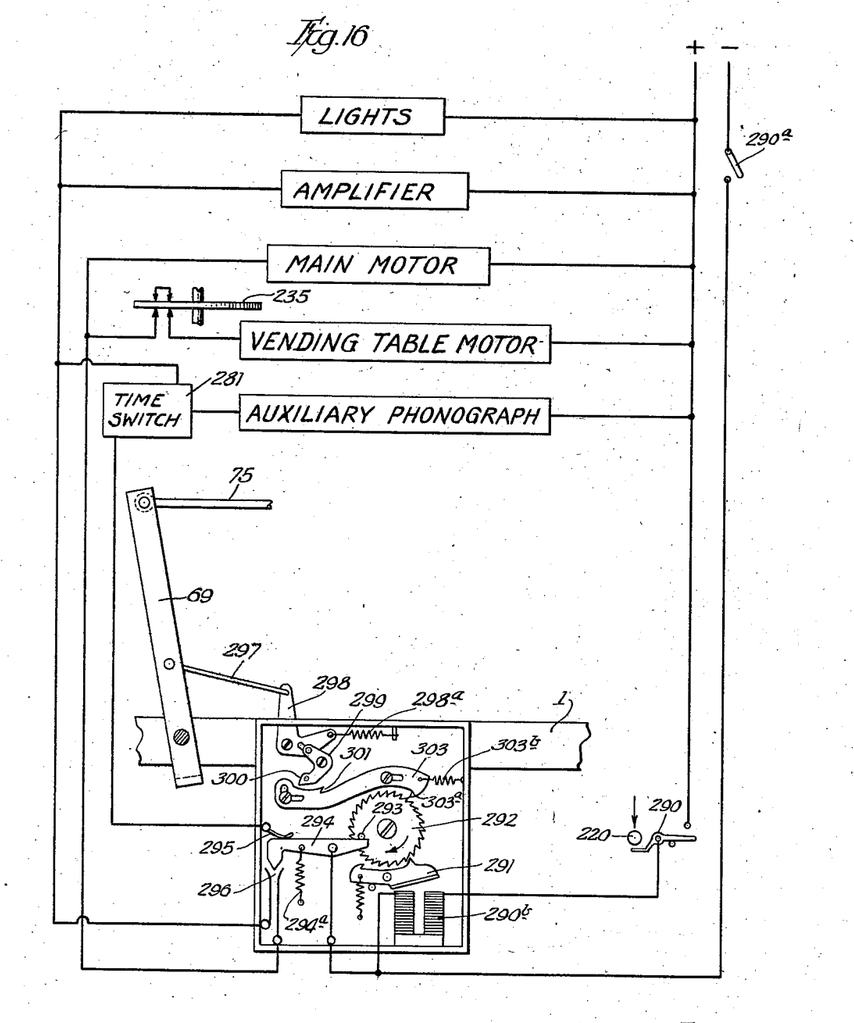
Fig. 16 is an electrical wiring diagram for the mechanism, showing also the main automatic electrical control means.

The rotation of the table 250 is stopped when the compartment containing the selected pamphlets is in proper position for the discharge of a pamphlet. For so controlling the table 250, the electrical circuit for the motor 251a is provided with the rotary plate switch 235 (shown in Figs. 10, 11 and 16). This plate switch 235 is loosely mounted on the shaft 234 and is rotated, through a sprocket 233 and the chain 231, by the rotation of the selector shaft 17. The body of the plate switch 235 is made of a suitable electrical insulator, for example, hard rubber. Embedded in the lower surface of the plate switch 235 are two concentric bands of copper 238, each forming a continuous circle but insulated from one another. Embedded in the upper surface of the plate switch 235 are two concentric bands of copper 236, positioned directly above the bands 238. The bands 236 are, however, non-continuous, and are interrupted by at least two spaced interruptions. Each of the bands 238 is electrically connected with the band 236 lying immediately above it by pins 242 extending through the plate switch 235. A pair of spring pressed contact members 239 mounted on the platform 252 engage the two bands 238, and another pair of spring pressed contact members 240 mounted on the table 250 engage the upper bands 236. The contacts 240 are connected together by a wire 241, as shown in Fig. 10, and the contacts 239 are connected to a power lead and to the motor 251a, respectively, as shown in Fig. 16.

When the device is put into operation by closing the main switch, the selector shaft 17 will be rotated to an extent determined by the particular rod 32 that has been pushed in, as heretofore explained, and the plate switch 235 will be rotated about the shaft 234 to a position determined by the amount of rotation of the selector shaft 17.

The closing of the main switch will at the same time energize the motor 251a, the current flowing through the plate switch 235 from one of the contacts 239, the associated band 238, the pin 242, the corresponding band 236, the contact 240, the wire 241, the contact 240, the band 236, the pin 242 and the band 238, back to the other contact 239. The table 250 will thus be rotated carrying the contacts 240 with it until those contacts reach the interruptions 237 in the bands 236, whereupon the circuit is broken. Since the angular position of the interruptions 237 with respect to the platform 252 is determined by the rotation given plate switch 235 by the selector shaft 17, the contacts 240 will reach this position and so interrupt the motor circuit and prevent further rotation of the table 250 at the moment the particular compartment bearing the selected pamphlets is in position for the proper operation of the pamphlet discharging mechanism.

*Clutch mechanism*

It will be remembered that the cam shaft 10 makes only one revolution during each cycle of the machine. The purpose of the clutch mechanism 11 is to disengage the cam shaft 10 from the pinion 9 once during each complete cycle of the machine. In that manner, each revolution of the cam shaft is interrupted.

Figure 14:
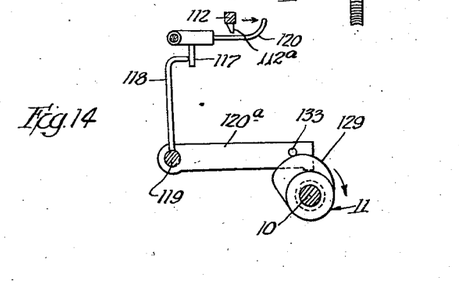
Fig. 14 is a detail sectional view of the mechanism for tripping the clutch on the cam shaft.

The clutch 11 comprises a sleeve 127a (Fig. 13) keyed to the cam shaft 10 so as to be slidable thereon. Fixed to this sleeve are pins 127 for engagement with openings 9a in the pinion 9. A spring 132 serves to urge the clutch into engagement with the pinion 9 to drive the cam shaft 10. Positioned about the clutch sleeve 127a is a cam member 130. The outer end of an arm 120a (Fig. 14), pivoted on a shaft 119, engages the cam 130 as the cam shaft rotates and thereby moves the clutch 11 away from the pinion 9 and disengages the pins 127 from the openings 9a. In Figs. 13 and 14, the arm 120a is shown in elevated position but as the shaft 10 and cam 130 rotate from the position shown in said figures, the end of the arm will be lowered to a position wherein it will contact the curved face of the cam, whereupon further rotation of the shaft will cause the arm 120a to effect lateral shifting of the cam along the shaft to disengage the clutch.

This action occurs as soon as the turntable 8 has been raised to its maximum height under the action of cam 14, and the parts then remain in playing position until the playing of the record has been finished.

*Means for operating clutch mechanism*

Figure 12:
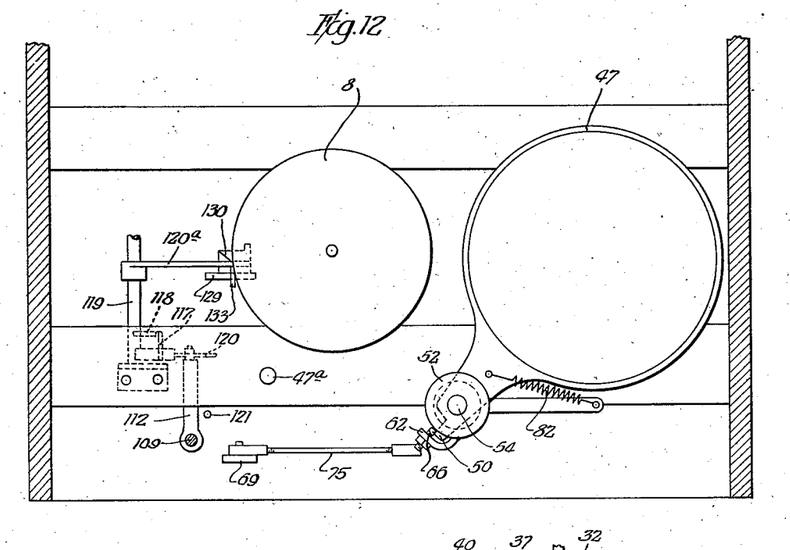
Fig. 12 is a horizontal sectional view taken on the line 12—12 of Fig. 3, much of the operating mechanism being omitted.

When the playing of the record has been completed, the cam shaft 10 is again engaged with the pinion 9 so that the phonograph mechanism may be restored to non-playing or inoperative position ready for the beginning of the next cycle of operation. That is accomplished by an arm 112 which is fixed on a vertical shaft 109 carrying the tone arm and sound pick-up 19 (see Fig. 3). A pawl 112a (Fig. 14) carried on the outer end of the arm 112 is adapted to engage the end of a trip lever 120, which is pivotally mounted in the frame 1. An arm 117, carried by the trip lever 120, engages a projecting pin member 118 extending upwardly from the shaft 119, to which is secured the arm 120a that acts to engage and disengage the clutch 11. This is best shown in Figs. 12 and 14.

As the record is played, the arm 112 is pivoted about the shaft 109 until at the end of the record it strikes the outer end of the trip lever 120 thereby pivoting the same and causing the shaft 119 to be rotated to raise the arm 120a and permit the clutch 11 to again connect the cam shaft 10 and the pinion 9.

The tone arm and the arm 112 are then returned to normal inoperative or non-playing position by an arm 121 (see Fig. 3) which is connected to a lever 122 pivotally attached to the frame 1. A roller carrier adjacent the outer end of lever 122 is engaged by the cam 13 as it rotates. The lever 122 is accordingly raised by the rotation of cam 13 and through the arm 121, returns the arm 112 and the tone arm to inoperative position. During this operation, the revolution of the cam shaft 10 has brought an eccentric collar 129, formed on the clutch 11, into engagement with a pin 133 carried by the arm 120a adjacent its outer end. The arm 120a is by this means held in its upper position despite the disengagement of the arm 112 from the trip lever 120. Because of the shape of the eccentric collar, the arm 120a is held in this upper position until the arm 112 has been swung back to its original position, whereupon the arm 120a will drop again into engagement with the cam member 130 ready to disengage the clutch upon further rotation of the cam shaft in a subsequent cycle of operation.

*Starting mechanism*

Figure 9:
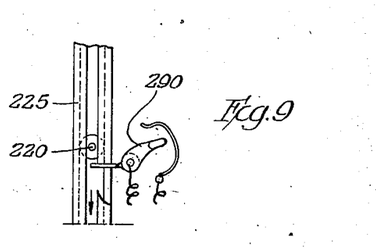
Fig. 9 is a detail view showing the coin operated butterfly switch for initiating operation of the mechanism.

A form of starting mechanism which has been found to be satisfactory is shown in Fig. 16, as well as a wiring diagram thereof. This starting device comprises a mechanism consisting of a ratchet wheel 292 and a pawl 291 pivotally mounted at its center and adapted to engage the teeth in the ratchet wheel 292 so as to rotate the same one notch in the direction of the arrow whenever the pawl is actuated. A pin 293 mounted on the outer face of the ratchet wheel 292 serves to hold a switch arm 294 in its upper position in contact with a contact member 295. A solenoid 290b is energized whenever a butterfly switch 290 is momentarily closed by the passage of the coin 220 down a coin chute 225 (see Fig. 9). The solenoid, when energized, actuates the pawl 291 to advance the ratchet wheel 292 in the direction of the arrow in Fig. 16 and thus to permit the switch arm 294 to move under the influence of a spring 294a into its lowermost position engaging a pair of contacts 296.

With the switch arm 294 in its lowermost position, the main motor 2 will be energized, setting in motion the pinion 9 and, through the action of clutch 11, the cam shaft 10, thus setting in motion the various parts and elements of the mechanism. The dispensing table motor 251a will likewise be energized with the closing of contacts 296, and the dispensing table 250 will be rotated until its rotation is stopped by the action of the rotary plate switch 235, as hereinbefore described.

Slidably mounted in the starting switch mechanism above the ratchet wheel 292 is an arm 303.

The arm 303 is normally held in its extreme right position by the action of a spring 303b and carries at one end thereof a pawl 303a adapted to engage one of the teeth in the ratchet wheel 292 when the arm 303 is moved to the left (Fig. 16) against the action of the spring, and so to rotate the ratchet wheel 292 in a direction opposite to that shown by the arrow. A notch 301 on the upper surface of the arm 303 is adapted to be engaged by a pawl 300 carried at one end of an L-shaped lever 299, which is pivotally mounted in the starting switch box. A pin 299a carried adjacent the other end of the lever 299 engages a slot 298b in a small bell crank lever 298, also pivotally mounted in the starting switch box. The levers 298 and 299 are normally held in the position shown in Fig. 16, with the pawl 300 disengaged from the arm 303, by means of a spring 298a.

As the lever 69 is pivoted under the action of the cam 13 to swing one of the record carriers 47 into playing position over the turntable 8, a link 297, pivotally connected to the lever 69, will pivot the bell crank lever 298 in the starting switch box against the action of the spring 298a so as to cause the pawl 300 to engage the notch 301 in the arm 303. When, at the conclusion of the playing of a record, the cam shaft 10 is again rotated and the lever 69 and the record carrier 47 are permitted to swing back into their initial position, the levers 298 and 299 will be pivoted under the action of the spring 298a so as to move the arm 303 to the left against the action of the spring 303b. The pawl 303a will thereupon engage one of the teeth of the ratchet wheel 292 and rotate this so as to bring the pin 293 into contact with the switch arm 294 and thereby raise the same against the action of the spring 294a. The switch arm 294, on being raised to its upper position, will break the circuit at 296 and will close the circuit again at 295. The breaking of the circuit at contacts 296 will stop the main motor 2 and will thus prevent further rotation of the cam shaft 10 as the various parts assume their inoperative position ready for the commencement of the next cycle of operations.

The butterfly switch 290 operates to energize, if a manual switch 290a is closed, the solenoid 290b and thus to close the main switch, and is operated by the action of the coin 220 in falling down the coin slide 225. As the coin 220 is placed in the recess in the coin slide 221 and this slide is pushed in, as has heretofore been described, the coin will, on reaching a point above the coin chute 225, drop down this chute, momentarily closing the butterfly switch 290 and thus closing the main switch through the action of the switch arm 294, the coin passing to a coin box or other suitable receptacle, not shown. Operation of the butterfly switch 290 during such time as the device is operating is prevented by an arm 226 (see Figs. 5 and 6) pivotally mounted on a shaft 227. When the turntable 8 is in its lower, inoperative position, it engages the upright portion of an L-shaped arm 228 connected to one end of the arm 226, so as to hold the arm 226 in a stationary horizontal position. When, however, the turntable 8 is in playing position, the arm 226, being unbalanced, will assume the position shown by the dotted lines in Fig. 6 and will in this position extend into the path of the coin slide 221 to prevent the operation thereof.

*Auxiliary phonograph*

An auxiliary phonographic mechanism 280 (see

Figs. 2 and 15) is provided for the purpose of periodically playing a phonographic record bearing an advertising speech, interspersed, if desired, with music to urge patronage of the machine and to attract attention thereto during those intervals when the machine is not vending reproduced or written information. For this purpose, a phonograph mechanism provided with automatic repeat means is desirably used. Such phonograph mechanism as that described in U. S. Patent No. 1,936,335, issued November 21, 1933, to J. R. Mitchell et al., is shown by way of illustration, it being understood that the invention is not limited thereto. For a full description of that mechanism, reference is made to the mentioned patent of Mitchell et al.

The auxiliary phonograph 280 is connected to the same amplifier 19a and loud speaker 19b as the main phonograph, and is electrically connected to the power leads through an automatic time switch 281 and the contact 295 in the automatic main switch box. As long as the switch arm 294 is in the upper (inoperative for the main mechanism) position engaging the contact 295 the phonograph 280 will play at intervals determined by the setting of the time switch 281. The time switch 81 may be of any well known type operated by spring or, preferably, electrically driven clock work mechanism. The phonograph 280 is provided with a tone arm 282. When the tone arm 282 of the phonograph 280 reaches the end of the record it trips a lever 283, which, by the mechanism shown in the Mitchell et al. patent, effects the return of the tone arm to its starting position to begin playing the record again. The return of the tone arm also, through a suitable linkage to the time switch 281, operates this switch to interrupt the phonograph motor circuit (and amplifier and lighting circuit for the device) whereby to prevent the immediate replaying of the record. As a result of the tripping of the lever 283 and the consequent return of the tone arm, the clock work mechanism of the time switch 281 is set in operation and, at the expiration of the time for which the switch is set, the phonograph motor circuit is again closed, and the amplifier and lights turned on, and the record replayed.

When a coin is deposited in the device the main switch is operated, as hereinbefore described, and the switch arm 294 is operated to break the auxiliary phonograph circuit at the contact 295 and closing the main circuit at the contact 296. The breaking of the auxiliary phonograph circuit at the contact 295 will prevent the operation of the auxiliary phonograph even if the time switch is meanwhile closed, until the switch arm 294 has again engaged the contact 295. When the auxiliary phonograph circuit is closed again at the contact 295 the phonograph 280 will resume playing either after an interval for the operation of the time switch or immediately.

Thus if the phonograph 280 is playing at the time a coin is deposited, the opening of the auxiliary phonograph circuit at the contact 295 will at once stop the phonograph 280 from playing by shutting off the motor thereof. Subsequently, during the operation of the vending apparatus, the bell crank lever 272 as it is pivoted downwardly, as hereinbefore described, will strike a plunger 276 of a release cable 277 and thereby trip the lever 283 in the phonograph 280. This will cause the tone arm 282 to be swung back its starting position to resume the playing of the record after the contact 295 has been closed.

In this way, it will be seen that the auxiliary phonograph 280 will periodically replay the record placed thereon as long as no coin is deposited in the machine, but when a coin is deposited in the machine, operation of the auxiliary phonograph is automatically interrupted. It will never therefore interfere with the operation of the vending mechanism but will be automatically restarted after the operation of the vending mechanism.

Operation of the machine

In operating the machine, the knob 201 and shaft 200 are rotated by the operator to bring the pointer 209 into line with the desired sign of the zodiac. This positions the pin 212 in line with that one of the rods 32 which controls the selection of the appropriate record and pamphlet for this sign of the zodiac. A coin is inserted in the coin slide 221 and this slide is pushed in. As the slide is pushed in, the pin 212 is operated to push in the rod 32 with which it is in line, and the coin is discharged into the coin chute 225. The coin, in falling down the chute, operates the starting mechanism heretofore described, and the motors 2 and 251a are started. The motor 2 drives the pinion 9, and through this the cam shaft 10, and thus brings into action the cams 12, 13 and 14. The cam 12 pivots the frame 27 to raise the segment 26 and rotate the selector shaft 17 until this rotation is stopped by the engagement of the stop 37 with the pushed-in rod 32. The rotation of the selector shaft 17, through the action of the cam 18, raises the slide 62 to position the screw 66 in line with the outer end 50 of the record carrier 47 bearing the selected record.

Meanwhile, the motor 251a has been rotating the table 250 positioned in the upper part of the machine cabinet. The rotation of the selector shaft 17 will, however, likewise rotate the plate switch 235 beneath the vending table 250 into proper position to break the electrical circuit of the motor 251a and to bring the table 250 to a stop with the particular compartment carrying the selected pamphlets in proper position for the discharge of a pamphlet.

When the slide 62 is properly positioned, the cam 13 engages the roller 81a to move the locking dog 69b into engagement with the star wheel 18a mounted on the selector shaft and so fix the position of the screw 66. The cam 13 then engages the roller 81 on the lever 69 and pivots this lever to swing the record carrier 47 outwardly over the turntable 8. Thereafter, the cam 14 engages the roller on the bell crank lever 299 to pivot the same and to raise the turntable 8 to its upper position. The turntable picks up the selected record as it passes up through the positioned record carrier 47 and raises the record to playing position in engagement with the sound pick-up 19. Once the record starts to play, the clutch is disengaged from the pinion 9 by the action of arm 120a. When the record has been played, the arm 112 actuates the trip lever 120 thereby raising the arm 120a to cause the clutch 11 to engage with the pinion 9. As the cam shaft 10 again rotates, the cam 14 operates the roller on the end of bell crank lever 99 allowing the turntable 8 to return to normal position. The cam 13 has, in the meantime held the record carrier out over the turntable, so that the turntable 8 in returning to normal position passes through the record carrier and deposits the played record thereon. The cam 13 thereafter operates the rollers 81a and 81 to disengage the locking dog 69b from star wheel 18a and to permit the springs 82 to return the record carrier 47 with the played record to the normal inoperative position. In the meantime the cam 12 has engaged the roller carried on the arm 275 and has pivoted this arm to cause the discharge arm 263 to discharge one of the pamphlets 255 from the proper compartment on the vending table 250 into the delivery chute 265. As the cam 13 permits the lever 69 to pivot back to its normal position, it strikes the roller carried on the arm 122 and thereby pivots the arm 124 upwardly to return the arm 112 and thereby the tone arm to initial position. At this point, the arm 303 in the starting box is actuated to move the switch arm 294 to its upward position. The motor 2 is accordingly deenergized by the opening of the contacts 296, and the machine is now in initial position ready to begin the next cycle.

As heretofore explained, the movement of the switch arm 294 to its upper position closes the contact 295 in the circuit including the time switch 281 and the auxiliary phonograph 280. Thus, the auxiliary phonograph 280 will thereafter be periodically played until the switch arm 294 is actuated to break the contact 295 and stop the auxiliary phonograph and to close the contacts 296 and start the main mechanism.

While I have shown and described a preferred embodiment of the present invention, it will be apparent to those skilled in the art that various modifications thereof may be made without departing from the spirit and scope of the present invention.

What I claim and desire to secure by Letters Patent of the United States is:

1. In a device having coin-controlled, electrically operated mechanism, and phonograph mechanism including a normally inoperative tone arm and means for repeatedly rendering the same operative to play a record; means operable in response to the operation of said coin-controlled, electrically operated mechanism for rendering said phonograph mechanism inoperative, and means operable in response to the operation of said last means for returning said tone arm to normal position, and for conditioning said phonograph for subsequent repeat operation upon completion of the operation of said coin-controlled mechanism.

2. In a device having coin-controlled mechanism, and phonograph mechanism including a normally inoperative tone arm, electrically actuated timing means for periodically effecting engagement of said tone arm with a record to play the same, and means operable upon completion of the playing of said record for moving said tone arm out of engagement therewith and returning the same to normal position; means operable in response to the initiation of operation of said coin-controlled mechanism and throughout the operation thereof for rendering said timing means ineffective, and means operable in response to the operation of said last means, even though the playing of said record has thus been interrupted, to effect operation of said means for returning the tone arm to normal position, prior to completion of the playing of said record.

MORRIS J. MARGULIS.